United States Patent [19]

Kakitani et al.

[11] 4,055,518

[45] Oct. 25, 1977

[54] VINYL CHLORIDE RESIN COMPOSITION

[75] Inventors: Haruaki Kakitani; Satoru Sugino, both of Yokkaichi, Japan

[73] Assignee: Mitsubishi Monsanto Chemical Company, Tokyo, Japan

[21] Appl. No.: 626,461

[22] Filed: Oct. 28, 1975

[30] Foreign Application Priority Data

Oct. 28, 1974 Japan .................................. 49-124088

[51] Int. Cl.$^2$ .............................................. C08J 9/00
[52] U.S. Cl. ........................ 260/2.5 AM; 260/23 AR; 260/23 XA; 260/45.75 R; 526/14; 526/49
[58] Field of Search ......... 260/23 XA, 86.3, 77.5 CR, 260/859 PV, 2.5 AM, 2.5 BE, 23 AR; 106/1.5, 45.75, 24; 428/423; 526/14, 49

[56] References Cited

U.S. PATENT DOCUMENTS

| | | | |
|---|---|---|---|
| 3,451,952 | 6/1969 | Slocombe | 260/2.5 AM |
| 3,513,118 | 5/1970 | Legue et al. | 260/859 PV |
| 3,755,271 | 8/1973 | Montgomery | 260/859 PV |
| 3,803,111 | 4/1974 | Munro et al. | 260/86.3 |
| 3,886,129 | 5/1975 | Kurz et al. | 260/86.3 |

OTHER PUBLICATIONS

Penn, PVC Technology, pp. 155-169, pub. by Maclaren & Sons (London), copyright 1962.

*Primary Examiner*—Donald E. Czaja
*Assistant Examiner*—W. E. Parker
*Attorney, Agent, or Firm*—Oblon, Fisher, Spivak, McClelland & Maier

[57] ABSTRACT

A crosslinkable vinyl chloride resin composition, comprising; a vinyl chloride copolymer containing hydroxyl groups or a substituent convertible to hydroxyl groups in the copolymer, a polyisocyanate compound as a crosslinking agent and a heat stabilizer composed principally of a salt of a metal of Group IIa in the Periodic Table.

14 Claims, No Drawings

4,055,518

VINYL CHLORIDE RESIN COMPOSITION

BACKGROUND OF THE INVENTION

1. Field of the Invention

The present invention relates to a vinyl chloride resin composition useful for molded articles of the cross-linked vinyl chloride series of resins, which can be easily processed by common plastics processing machinery. The molded articles possess smooth surfaces and are excellent in appearance. Furthermore, they possess improved physicl properties such as permanent strain and recovery properties under compression and high-temperature deformation characteristics.

2. Description of the Prior Art

Vinyl chloride resin (hereinafter abbreviated as "PVC") is widely utilized in various fields of application because its hardness can be easily controlled by changing the amount of plasticizer blended with the resin. Also, the resin can be processed at high speed by common plastics processing machinery and is characterized by excellent weatherability and non-flammability. However, on the other hand, PVC resins have the disadvantage that under compression the permanent strain induced is substantial and the recovery chracteristics are poor. Furthermore, the resins easily deform at elevated temperatures. Various methods of crosslinking, PVC during processing have been attempted to improve these deficiencies. For example, the resin has been cross-linked through the mechanism of an ionic reaction as represented by a method in which magnesium oxide, zinc oxide or the like is blended with the resin. However, this technique is of no practical value since it promotes the decomposition of PVC through reaction of the chlorine atom in PVC. Another technique is known in which PVC is crosslinked during processing by a reaction between functional groups introduced into the molecule or by the ionic reaction of a functional group with a crosslinking agent. However, this method cannot be generally used as a manufacturing method for molded articles of crosslinked PVC because it is deficient from the point of view that crosslinking takes place during kneading in the processing step which makes molding impossible because of the narrow temperature processing range of PVC series resins or because the molded articles are substantially colored as a result of being crosslinked upon heating above the decomposition temperature of PVC. Another method of crosslinking is a radical polymerization reaction with a peroxide. This method is difficult as a general method since crosslinking tends to easily take place during kneading and, in addition, the molded article produced is substantially colored because the radical decomposition of PVC is promoted.

For the reasons presented above it can be readily appreciated that it is difficult to mold and cross-link PVC by common processing machinery in the manufacture of molded articles of cross-linked PVC, since PVC which is easily decomposed by heat, requires high processing temperatures and processes a very narrow processing temperature range.

A need continues to exist for a method of improving the characteristics of PVC resin so that the same is more amenable to processing to form molded articles therefrom.

SUMMARY OF THE INVENTION

Accordingly, one object of the present invention is to provide a method for improving the properties of PVC resin to render the same more amenable to processing to form molded products therefrom.

Briefly, this object and other objects of the present invention as hereinafter will become more readily apparent can be attained by a PVC resin composition comprising a PVC copolymer containing hydroxyl groups or substituents convertible to hydroxyl groups, a polyisocyanate compound as a crosslinging agent, a heat stabilizer which is chiefly a salt of a metal of Group IIa of the Periodic Table, a plasticizer and if desired other conventional additives. The resulting PVC composition can be molded and simultaneously crosslinked in the homogeneous state and the molded articles obtained have a smooth surface and excellent appearance and possess such improved physical properties as permanent strain and recovery after compression and high-temperature deformation.

DETAILED DESCRIPTION OF THE PREFERRED EMBODIMENTS

The PVC polymer which is used as a base for the composition of the present invention is obtained, for example, by copolymerizing vinyl chloride monomer with a comonomer having a hydroxyl group in the molecule. Suitable comonomers include 2-hydroxyethylacrylate, 2-hydroxyethylmethacrylate, 2-hydroxypropylacrylate, 2-hydroxypropylmethacrylate, 3-chloro-2-hydroxypropylmethacrylate, 3-hydroxybutylacrylate, ethyl-2-hydroxyethylfumarate, hydroxybutylvinylether and the like. The PVC polymer contains preferably 0.5 to 10% by weight of the above described comonomer. If the comonomer content is less than 0.5% by weight, the crosslinkability of the resin is not sufficient, and if the content is greater than 10% by weight, the excellent physical properties of PVC are impaired.

Another process of preparing the PVC polymer is to chemically treat a PVC containing copolymer in such a manner that hydroxyl groups are formed within the molecule. Suitable examples of such a chemical treatment include a method of hydrolyzing a vinyl chloridevinyl ester copolymer, a process of treating a copolymer of vinyl chloride and a vinyl monomer containing an epoxy group with an acid to open the epoxy ring, a process of hydrolyzing a vinyl chloride-N-alkoxymethylacrylamide copolymer, and the like. Yet another possible technique is to employ the vinyl chloride-N-alkoxymethylacrylamide copolymer or vinyl chloride-epoxy compound copolymer as it is during the kneading step in processing of the copolymer whereby the copolymer is hydrolyzed to form a hydroxyl group containing vinyl chloride copolymer.

The PVC resin composition of the present invention is characterized by the combination of one of the above described vinylchloride copolymers, a polyisocyanate compound which functions as a crosslinking agent for the vinyl chloride copolymer and a heat stabilizer mainly composed of a salt of a metal of Group IIa of the Periodic Table.

Suitable polyisocyanate compounds include the following two kinds of compounds: (1) A compound containing two or more free isocyanate groups such as tolylene diisocyanate, diphenylmethane diisocyanate, hexamethylene diisocyanate, trimethylol propane-tolyene diisocyanate, polymethylene polyphenyl isocyanate, and the like. (2) A compound which is a derivative of a polyisocyanate formed by masking the isocyanate group in a compound with an appropriately reactive molecule such as phenol, cresol, octyphenol, naphthol, a malonic ester, hydroxylamine, caprolactam, diphenylamine or α-pyrrolidone. The masking group of the derivative can be readily removed to restore the free isocyanate groups of the polyisocyanate compound.

The heat stabilizer used in the PVC resin composition of the present invention is a compound mainly composed of a salt of a metal of Group IIa in the Periodic Table, such as, for example, salts of barium, calcium, magnesium, strontium and the like of an organic acid such as lauric acid, stearic acid, naphthenic acid, ricinoleic acid, octylic acid, and the like. Although salts of lead, tin, cadmium and zinc may be partially used together therewith, the amounts of such salts used should be less than 0.2% as the metal based on the weight of the PVC copolymer. If the amount is in excess of 0.2%, the processability of the composition is decreased. The conventional crosslinkable PVC resin compositions contain as a heat stabilizer, only an inorganic or organic acid salt of lead, tin, cadmium or zinc which salts are well known as typical heat stabilizers for PVC. However it is quite impossible to mold the conventional crosslinkable PVC resin because a crosslinking reaction takes place during kneading or molding of the resin when processing at a temperature above the melting temperature of the resin. By contrast the crosslinkable PVC resin composition of the present invention comprising a polyvinyl chloride copolymer containing hydroxyl groups in the molecule, a heat stabilizer composed mainly of a salt of a Group IIa metal and a polyisocyanate crosslinking agent can be molded without any technical problems under ordinary processing condition to obtain a molded article of excellent appearance and physical properties because it can be kept in a homogeneous state even if the crosslinking reaction takes place during kneading or molding above the melting temperature. The crosslinkable PVC resin composition of the present invention may also be blended with an epoxy compound, an organic phosphite and various kinds of antioxidizing agents and, in addition, such a well known plasticizer as dioctylphthalate (DOP), a filler, a pigment and the like according to desired circumstances.

The steps of manufacturing a molded article of crosslinked PVC from the crosslinkable PVC resin composition of the present invention will now be explained. The components of the crosslinkable resin composition of the present invention is a conventional ribbon blender or Henschel type mixer. The mixer resin composition is homogeneously kneaded by a machine such as a mill roll, a Banbury mixer, an extruder or the like, and thereafter is fed in the molded step of calendering, extrusion, injection or pressing. In calendering the composition is continuously fed to a calender and calendered into a film or sheet. In the case of extrusion molding, injection molding and pressing molding, the kneaded composition may be molded after it is pelletized. The molding conditions are the same as the conventional processing conditions for PVC and any specific conditions are not required. As described above in detail, the crosslinkable PVC resin composition of the present invention is excellent from the point that a molded article of cross-linked PVC of excellent physical properties can be easily obtained using the conventional processing machinery under the conventional PVC processing conditions without any additional specific operational procedures.

Having generally described this invention, a further understanding can be obtained by reference to certain specific examples which are provided herein for purpose of illustration only and are not intended to be limiting unless otherwise specified. In the Examples the term "part" means "part by weight."

EXAMPLES

Each sheet of PVC resin obtained from the Examples and comparative Examples was measured for the degree of crosslinking, tensile strength, elongation and permanent strain induced from compression according to the below described methods. Measurement of gel content:

About 1g of a sample taken from each sheet obtained from the Examples and Comparative Examples was immersed in tetrahydrofuran (THF) and, after one day, THF insolubles were removed by filtration and dried in a vacuum. The dried THF insolubles were immersed in THF for one day again. After repeating this operation three times, the dried insolubles were weighed. The gel content is given by the following formula:

Gel content (%) = $W_2/W_1 \times 100$ $W_1$: PVC content (g) in sample
$W_2$: THF insolubles (g) in sample Measurement of tensile strength and elongation The procedure of JISK-6723, "Measurement of Vinyl Elastomeric compound" was followed.

Compression test

A circular disc 2cm in diameter cut from each sheet obtained from the Examples and Comparative Examples was used as the sample. Each sample piece was compressed under a load of 10Kg/cm² at 150° C for 5 minutes, and after 5 minutes, unloaded, cooled and allowed to stand at room temperature for one day. The test pieces were measured for thickness before and after they were alloyed to stand for one day. The resulting permanent strain was determined by the following formula.

$$\text{Permanent strain (\%)} = (1 - \frac{H_1}{H_0}) \times 100$$

$H_0$: Thickness of the test piece before it was allowed to stand
$H_1$: Thickness of test piece after it was allowed to stand for one day

EXAMPLE 1

100 Parts of vinyl chloride-hydroxyethylacrylic ester copolymer (average degree of polymerization $\bar{P}$ = 1,400, acrylic ester content 2%) obtained by emulsion polymerization, 50 parts of dioctylphthalate (DOP), 4 parts of Coronate L (trade name for trimethylol propanetolylene-diisocyanate made by Japan Polyurethane Co., Ltd.), 3 parts of a heat stabilizer (refer to Table 1) and 2 parts of epoxy soya bean oil were blended and kneaded by mill rolls at 170° for 5 minutes to form a sheet 0.5mm thick. The above sheets were laminated and pressed at 170° for 5 minutes to make a pressed sheet 1mm thick. The kneading properties of the rolls, the gel content of the sheet and physical properties (tensile strength, elongation, and permanent strain after compression) were measured and the results are shown in Table 1.

Table 1

| No. | Heat stabilizer (part) | Kneading properties of the rolls | Gel content of the rolled sheet % | Gel content of the pressed sheet % | Tensile strength Kg/cm$^2$ | Elongation % | Permanent strain of the compression % |
|---|---|---|---|---|---|---|---|
| 1 | Calcium stearate (3) | good | 46.0 | 48.0 | 212 | 288 | 25 |
| 2 | Barium stearate (3) | " | 53.6 | 55.0 | 215 | 280 | 20 |
| 3 | Magnesium stearate (3) | " | 36.5 | 41.8 | 204 | 300 | 26 |

EXAMPLE 2

100 Parts of vinylchloride-ethyl-2-hydroxyethyl fumarate copolymer (average degree of polymerization $\bar{P}$ = 1,400, ethyl-2-fumarate content 3%), 50 parts of DOP, 4 parts of Coronate L, 3 parts of a stabilizer (refer to Table 2) and 2 parts of epoxy soya bean oil were blended and kneaded by mill rolls at 170° C for 5 minutes to form a sheet 0.5 mm thick.

Several of the above sheets were laminated and pressed at 170° C for 5 minutes to form a laminated pressed sheet 1 mm thick. The kneading properties of rolls, the gel content of the sheet and the physical properties (tensile strength, elongation and permanent strain after compression) were measured and the results are shown in Table 2.

Table 2

| No. | Heat stabilizer (part) | Kneading properties of the rolls | Gel content of rolled sheet % | Gel content of the pressed sheet % | Tensile strength Kg/cm$^2$ | Elongation % | Permanent strain after compression % |
|---|---|---|---|---|---|---|---|
| 1 | Calcium stearate (3) | good | 27.5 | 30.4 | 198 | 315 | 34 |
| 2 | Barium stearate (3) | " | 38.1 | 40.3 | 200 | 305 | 26 |
| 3 | Magnesium stearate (3) | " | 30.7 | 35.2 | 195 | 310 | 30 |

EXAMPLE 3

100 parts of vinyl chloride-hydroxyethylacrylic ester copolymer the same as used in Example 1, 50 parts of DOP, 4 parts of diphenylmethane diisocyanate, 3 parts of a heat stabilizer (refer to Table 3) and 2 parts of epoxy soya bean oil were blended and kneaded by mill rolls at 170° C for 5 minutes to form a sheet 0.5 mm thick.

The above sheets were laminated and pressed at 170° C for 5 minutes to form a pressed laminated sheet 1 mm thick. The kneading properties of rolls, the gel content of the sheet and the physical properties (tensile strength, elongation and permanent strain after compression) were measured and the results are shown in Table 3.

Table 3

| No. | Heat stabilizer (part) | Kneading properties of rolls | Gel content of rolled sheet % | Gel content of pressed sheet % | Tensile strength Kg/cm$^2$ | Elongation % | Permanent strain after compression % |
|---|---|---|---|---|---|---|---|
| 1 | Calcium stearate (3) | good | 45.1 | 46.0 | 210 | 283 | 25 |
| 2 | Calcium ricinoleate (3) | " | 47.3 | 48.1 | 213 | 290 | 25 |
| 3 | Barium stearate (3) | " | 51.7 | 53.0 | 213 | 294 | 20 |
| 4 | Barium octylate (3) | " | 56.2 | 56.0 | 218 | 280 | 21 |
| 5 | Calcium stearate (2) Zinc stearate (1) | " | 61.7 | 63.5 | 224 | 271 | 15 |
| 6 | Calcium stearate (1) Zinc stearate (1) Barium stearate (2) | " | 64.8 | 65.3 | 221 | 268 | 14 |
| 7 | | " | 64.8 | 66.1 | 225 | 260 | 10 |
| 8 | Zinc stearate (1) Barium stearate (2) | " | 61.7 | 61.0 | 221 | 265 | 15 |
| 9 | Cadmium stearate (1) Barium stearate (1) | " | 67.3 | 68.7 | 236 | 280 | 10 |
| 10 | Cadmium stearate (1) Magnesium stearate (2) | " | 53.4 | 56.3 | 223 | 279 | 20 |
| | Zinc | | | | | | |

Table 3-continued

| No. | Heat stabilizer (part) | Kneading properties of rolls | Gel content of rolled sheet % | Gel content of pressed sheet % | Tensile strength Kg/cm² | Elongation % | Permanent strain after compression % |
|---|---|---|---|---|---|---|---|
| | stearate (1) | | | | | | |

EXAMPLE 3

100 Parts of vinyl chloride-hydroxyethylacrylic ester copolymer, 50 parts of DOP, 4 parts of diphenylmethane diisocyanate, 2 to 3 parts of a heat stabilizer (refer to Table 4) and 2 parts of epoxy soya bean oil were blended and kneaded by mill rolls at 170° C for 5 minutes to make pellets of the composition. The pellets were extruded through a 38mm extruder provided with a slit at the Cylinder temperature of 170° C and die temperature of 180° C to form a belt-like extruded article, 2 mm thick and 5 mm wide. The kneading properties of the rolls, the gel content and the physical properties (tensile strength, elongation and permanent strain after compression) of the belt were measured and the results are shown in Table 4.

Table 4

| No. | Heat stabilizer (part) | Kneading properties of rolls | Gel content of rolled sheet % | Gel content of pressed sheet % | Tensile strength Kg/cm² | Elongation % | Permanent strain after compression % |
|---|---|---|---|---|---|---|---|
| 1 | Calcium stearate (2) Zinc stearate (0.5) | good | 61.1 | 62.0 | 215 | 272 | 20 |
| 2 | Calcium ricinoleate (2) Zinc octylate (0.5) | " | 58.9 | 60.3 | 210 | 267 | 20 |
| 3 | Barium stearate (2) Zinc stearate (0.5) | " | 63.2 | 65.0 | 225 | 253 | 17 |
| 4 | Barium octylate (2) Cadmium stearate (0.7) | " | 66.4 | 67.2 | 220 | 263 | 15 |

COMPARATIVE EXAMPLE

Pressed sheets were made in the same manner as described in Example 1 with the exception that a metallic salt was used as a stabilizer that is not within the scope of the heat stabilizing salts in the composition of the present invention. The results of the same measurements are shown in Table 5.

Table 5

| No. | Heat stabilizer (part) | Kneading properties of the rolls | Gel content of rolled sheet % | Gel content of pressed sheet % | Tensile strength Kg/cm² | Elongation % | Permanent strain after compression % |
|---|---|---|---|---|---|---|---|
| 1 | Cadmium stearate (3) | impossible | — | — | — | — | — |
| 2 | Zinc stearate (3) | " | — | — | — | — | — |
| 3 | Tribasic lead sulfate (3) | " | — | — | — | — | — |
| 4 | Dibutyl tin dilaurate (3) | " | — | — | — | — | — |

As is evident from the Comparative Example in Table 5, kneading was impossible because of the crosslinking reaction.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A crosslinkable vinyl chloride resin composition comprising; a vinyl chloride copolymer containing from 90 to 99.5 wt.% of vinyl chloride and from 10 to 0.5 wt.% of a hydroxyl group containing comonomer, from 1 to 10 parts by weight of a polyisocyanate compound per 100 weight parts of said vinyl chloride copolymer, and a stabilizer composed principally of salt of a metal of Group IIa in the Periodic Table.

2. The resin composition of claim 1, wherein said vinyl chloride copolymer is obtained by the emulsion polymerization of vinyl chloride and a comonomer selected from the group consisting of 2-hydroxyethylacrylate, 2-hydroxyethylmethacrylate, 2-hydroxypropylacrylate, 2-hydroxypropylmethacrylate, 3-chloro-2-hydroxypropylmethacrylate, 3-hydroxybutylacrylate, ethyl-2-hydroxyethyl fumarate and hydroxybutylvinylether.

3. The resin composition of claim 1, wherein said vinyl chloride copolymer is obtained by the suspension polymerization of vinyl chloride and a comonomer selected from the group consisting of 2-hydroxyethylacrylate, 2-hydroxyethylmethacrylate 2-hydroxypropylacrylate, 2-hydroxypropylmethacrylate, 3-chloro-2-hydroxypropylmethacrylate, 3-hydroxybutylacrylate, ethyl-2-hydroxyethyl fumarate and hydroxybutylvinylether.

4. The resin composition of claim 1, wherein said polyisocyanate compound is (A) a polyisocyanate selected from the group consisting of tolylene diisocyanate, diphenylmethane diisocyanate, hexamethylene diisocyanate, trimethyolopropanetolylene diisocyanate adduct, and polymethylene polyphenyl isocyanate, or (B) a compound which is a derivative of a polyisocyanate formed by masking the isocyanate group in a compound with a compound selected from the group consisting of phenol, cresol, octylphenol, naphthol, a malonic ester, hydroxylamine, caprolactam, diphenylamine, and alpha-pyrrolidone.

5. The resin composition of claim 1, wherein said stabilizer is principally composed of a salt of a metal selected from the group consisting of barium, calcium, magnesium and strontium and an organic acid selected from the group consisting of lauric acid, stearic acid, naphthenic acid, ricinoleic acid, and octylic acid.

6. The resin composition of claim 1, wherein the amount of said stabilizer is less than 3 parts of weight per 100 parts by weight of said vinyl chloride copolymer.

7. The resin composition of claim 1 which further comprises an epoxy compound, a filler, a pigment and a blowing agent.

8. A method of simultaneously crosslinking and molding a polyvinyl chloride composition in the homogeneous state which comprises blending a vinyl chloride copolymer containing from 90 to 99.5 wt.% of vinyl chloride and from 10 to 0.5 wt.% of a hydroxyl group containing comonomer with from 1 to 10 parts by weight of a polyisocyanate compound per 100 weight parts of said vinyl chloride copolymer and a stabilizer composed prinicipally of a salt of a metal of Group IIa in the Periodic Table and subsequently molding this blended mixture.

9. The method of claim 8, wherein said vinyl chloride copolymer is obtained by the emulsion polymerization of vinyl chloride and a comonomer selected from the group consisting of 2-hydroxyethylacrylate, 2-hydroxyethylmethacrylate, 2-hydroxypropylacrylate, 2-hydroxypropylmethacrylate, 3-chloro-2-hydroxypropylmethacrylate, 3-hydroxybutylacrylate, ethyl-2-hydroxyethyl fumarate and hydroxybutylvinylether.

10. The method of claim 8, wherein said vinyl chloride copolymer is obtained by the suspension polymerization of vinyl chloride and a comonomer selected from the group consisting of 2-hydroxyethylacrylate, 2-hydroxyethylmethacrylate 2-hydroxypropylacrylate, 2-hydroxypropylmethacrylate, 3-chloro-2-hydroxypropylmethacrylate, 3-hydroxybutylacrylate, ethyl-2-hydroxyethyl fumarate and hydroxybutylvinylether.

11. The method of claim 8, wherein said polyisocyanate compound is (A) a polyisocyanate selected from the group consisting of tolylene diisocyanate, diphenylmethane diisocyanate, hexamethylene diisocyanate, trimethylolpropanetolylene diisocyanate adduct, and polymethylene polyphenyl isocyanate, or (B) a compound which is a derivative of a polyisocyanate formed by masking the isocyanate group in a compound with a compound selected from the group consisting of phenol, cresol, octylphenol, nphthol, a malonic ester, hydroxylamine, caprolactam, diphenylamine, and alpha-pyrrolidone.

12. The method of claim 8, wherein said stabilizer is principally composed of a salt of a metal selected from the group consisting of barium, calcium, magnesium and strontium and an organic acid selected from the group consisting of lauric acid, stearic acid, naphthenic acid, ricinoleic acid, and octylic acid.

13. The method of claim 8, wherein the amount of said stabilizer is less than 3 parts by weight per 100 parts by weight of said vinyl chloride copolymer.

14. The method of claim 8, wherein an epoxy compound, a filler, a pigment and a blowing agent are also blended with said vinyl chloride copolymer.

* * * * *